James A. Maynard's Sectional Tubular Steam Boiler.

119,038.

Patented Sep. 19, 1871.

Witnesses,
N. W. Stearns
N. J. Cambridge

Inventor,
Jas. A. Maynard

James A. Maynard's Sectional Tubular Steam Boiler.

119,038. Patented Sep. 19, 1871.

2 Sheets--Sheet 2.

Witnesses,
N. W. Stearns
W. F. Cambridge

Inventor,
Jas. A. Maynard

UNITED STATES PATENT OFFICE.

JAMES A. MAYNARD, OF NEWTONVILLE, MASSACHUSETTS.

IMPROVEMENT IN SECTIONAL TUBULAR STEAM-BOILERS.

Specification forming part of Letters Patent No. 119,038 dated September 19, 1871.

*To all whom it may concern:*

Be it known that I, JAMES A. MAYNARD, of Newtonville, in the county of Middlesex and State of Massachusetts, have invented an Improved Sectional Tubular Steam-Boiler, of which the following is a full, clear, and exact description, reference being had to the accompanying drawing making part of this specification, in which—

Figure 1:
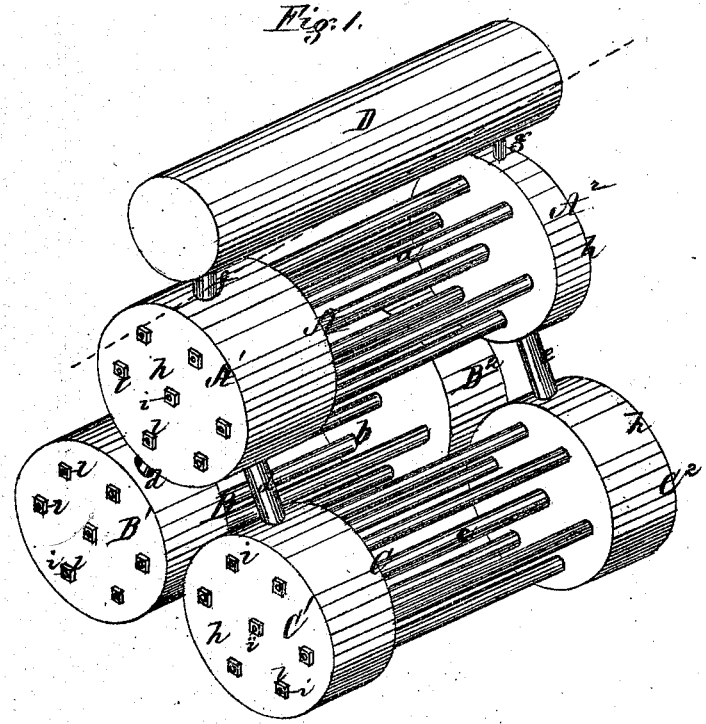
Figure 2:
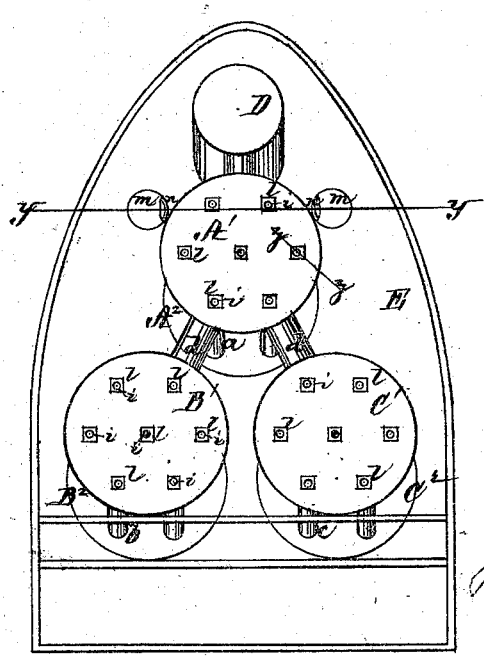
Figure 3:
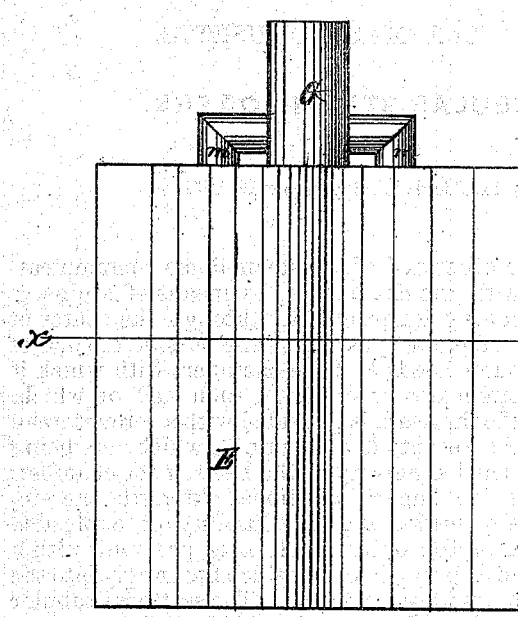
Figure 4:
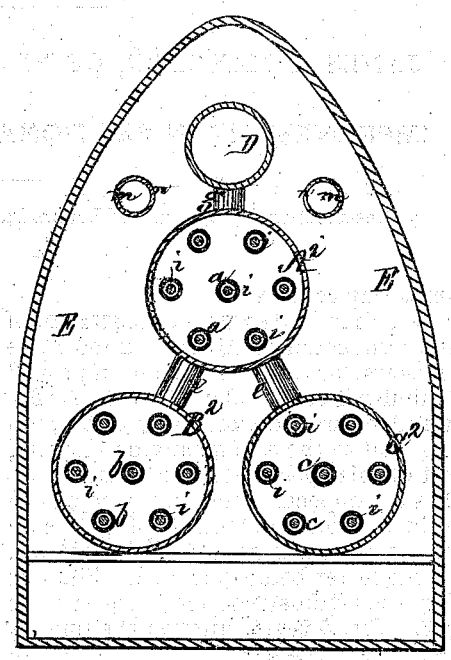
Figure 6:
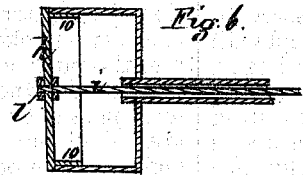
Figure 5:
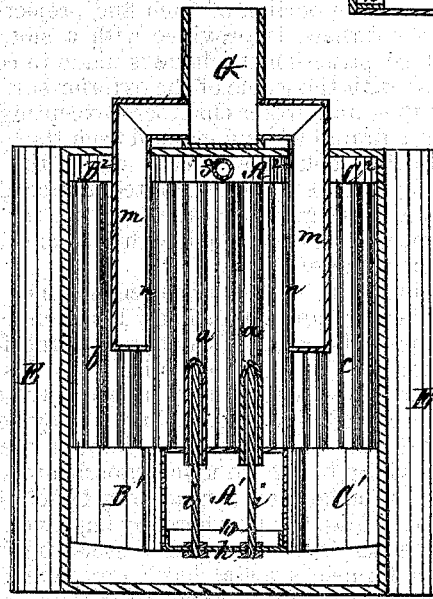
Figure 7:
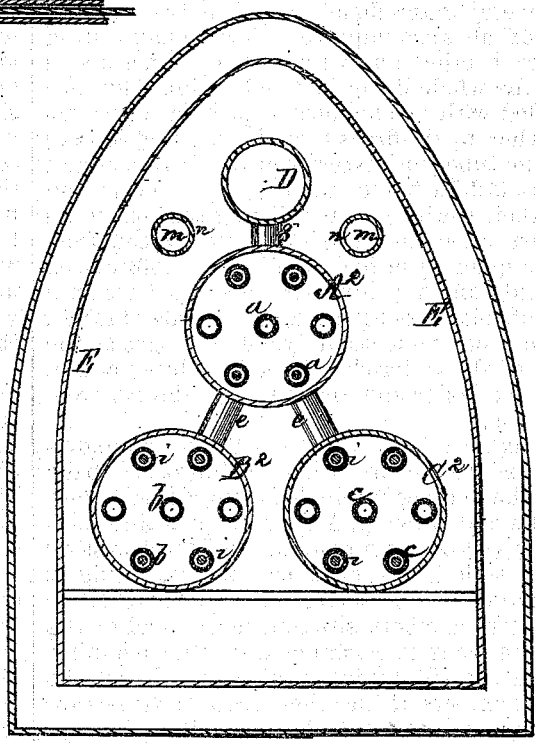

Figure 1 is a perspective view of my improved sectional tubular boiler detached. Fig. 2 is an elevation of the same inclosed within its furnace, the front of the latter being removed. Fig. 3 is a plan. Fig. 4 is a transverse section on the line $x\ x$ of Fig. 3. Fig. 5 is a section on the line $y\ y$ of Fig. 2. Fig. 6 is a section on the line $z\ z$ of Fig. 2. Fig. 7 is a modification to be referred to.

My invention consists in one or more series or groups of tubes communicating at each end with water-chambers provided with removable heads, the several water-chambers (when two or more series of tubes are employed) also communicating with each other and with a steam-dome above them, the whole being inclosed within a furnace provided with smoke-flues of peculiar construction, whereby the fire is brought in direct contact with the tubes and exterior of the chambers and the heat is distributed uniformly upon and around all of their surfaces, thus utilizing the heat to its greatest extent, and producing more steam from a given quantity of fuel than has heretofore been obtained; and my invention also consists in a series of bolts passing through the series of tubes, and connecting and securely holding together the heads of the water-chambers, thereby strengthening the boiler and reducing the danger from explosion.

To enable others skilled in the art to understand and use my invention, I will proceed to describe the manner in which I have carried it out.

In the said drawing, A B C represent three portions or sections of my tubular boiler, consisting of three series, $a\ b\ c$, of tubes, communicating at each end with water-chambers $A^1\ B^1\ C^1\ A^2\ B^2\ C^2$. The water-chambers situated at one end of the tubes are made to communicate with each other through the short pipe or nozzles $d\ d$, and the water-chambers at the other end of the tubes are made to communicate with each other through the short pipes or nozzles $e\ e$. D is the steam-dome or superheater, one end of which communicates with the chamber $A^1$ by means of a pipe, $f$, the other end of the steam-dome communicating with the chamber $A^2$ by means of a pipe, $g$. Extending longitudinally through the center of each tube, and passing to the outside of each of the outer heads $h$ of the chambers with which it communicates, is a bolt, $i$, each end of which, outside the head, is provided with a screw-thread for the reception of a nut, $l$, which, on being tightened snugly up to the head of the chamber, serves to impart additional strength thereto, thereby preventing the liability of explosion. Each of the outer heads $h$ is provided with a flange or projection, 10, which fits snugly into the end of its water-chamber. The sectional tubular boiler above described is placed within a furnace, E, which entirely surrounds it, with the exception of the outer heads of the water-chambers. $m\ m$ are two smoke-flues, extending about half way into the interior of the furnace, and at equal distances from the center thereof. These smoke-flues pass outside of the rear of the furnace and are united in one common flue, G, of larger diameter. The portion of each flue projecting inside the furnace is provided with a slot, $n$, by which construction the flame is made to come in contact with the whole of the exterior surfaces of the tubes and water-chambers excepting their heads, a draught being created from the burning fuel to the smoke-flue on each side of the boiler, whereby the heat is distributed uniformly and utilized to its greatest capacity, and the steam generated more rapidly and with greater economy than heretofore.

By inclosing the boiler in the manner above described, within the furnace, I am enabled to superheat the steam, which important feature renders this construction still more desirable. The water-line may be kept at the level shown by the dotted line, Fig. 1, but it may be kept below the bottom of the steam-dome in the event of the steam being too much superheated.

For use on land the furnace may be solidly constructed of brick, but where my improved boiler is to be employed in steam-vessels the furnace may be formed of metal, having an inner and an outer casing, with a water-chamber between them, as seen in Fig. 7, the said water-chamber communicating with the tubes, steam-dome, and water-chambers of the boiler. It is intended to provide the boiler with suitable gauge-cocks at the points desired.

What I claim as my invention, and desire to secure by Letters Patent, is—

1. The within-described sectional boiler, consisting essentially of a series of independent clusters of water-tubes connecting water-chambers which communicate with each other through short pipes or nozzles, substantially as and for the purpose described.

2. A furnace, E, provided with internal slotted smoke-flues m, constructed and arranged substantially in the manner and for the purpose described.

3. The bolts i, in combination with the removable heads h, substantially as and for the purpose set forth.

4. A sectional tubular boiler, in combination with the furnace E, provided with internal smoke-flues m, the whole arranged and constructed to operate substantially as and for the purpose specified.

Witness my hand this 8th day of May, A. D. 1871.

JAS. A. MAYNARD.

Witnesses:
P. E. TESCHEMACHER,
W. J. CAMBRIDGE.